United States Patent
Wang et al.

(10) Patent No.: US 11,680,015 B2
(45) Date of Patent: Jun. 20, 2023

(54) $CO_2$ SOLIDIFIED FIBER CEMENT BOARD AND ITS PREPARATION METHOD

(71) Applicant: WUHAN UNIVERSITY OF TECHNOLOGY, Wuhan (CN)

(72) Inventors: Fazhou Wang, Wuhan (CN); Zhichao Liu, Wuhan (CN); Shuguang Hu, Wuhan (CN); Lu Yang, Wuhan (CN)

(73) Assignee: WUHAN UNIVERSITY OF TECHNOLOGY, Wuhan (CN)

( * ) Notice: Subject to any disclaimer, the term of this patent is extended or adjusted under 35 U.S.C. 154(b) by 0 days.

(21) Appl. No.: 17/888,536

(22) Filed: Aug. 16, 2022

(65) Prior Publication Data

US 2023/0101697 A1    Mar. 30, 2023

(30) Foreign Application Priority Data

Sep. 29, 2021   (CN) .......................... 202111150020.3

(51) Int. Cl.

| | | |
|---|---|---|
| *C04B 12/00* | (2006.01) | |
| *C04B 14/28* | (2006.01) | |
| *C04B 14/42* | (2006.01) | |
| *C04B 14/18* | (2006.01) | |
| *C04B 18/14* | (2006.01) | |
| *C04B 14/36* | (2006.01) | |
| *C04B 16/06* | (2006.01) | |
| *C04B 14/04* | (2006.01) | |
| *C04B 103/54* | (2006.01) | |
| *C04B 103/44* | (2006.01) | |

(52) U.S. Cl.
CPC .......... *C04B 12/007* (2021.05); *C04B 14/043* (2013.01); *C04B 14/185* (2013.01); *C04B 14/28* (2013.01); *C04B 14/36* (2013.01); *C04B 14/42* (2013.01); *C04B 16/0641* (2013.01); *C04B 18/146* (2013.01); *C04B 2103/445* (2013.01); *C04B 2103/54* (2013.01)

(58) Field of Classification Search
CPC ... C04B 12/007; C04B 14/043; C04B 14/185; C04B 14/28; C04B 14/36; C04B 14/42; C04B 16/0641; C04B 18/146; C04B 2103/445; C04B 2103/54
See application file for complete search history.

(56) References Cited

U.S. PATENT DOCUMENTS

| | | | |
|---|---|---|---|
| 6,676,744 B2 * | 1/2004 | Merkley | ................. C04B 18/24 106/729 |
| 7,754,320 B2 * | 7/2010 | Lyons | ..................... C04B 28/02 428/318.6 |
| 8,241,419 B2 * | 8/2012 | Hamilton | .................. D21J 1/16 156/39 |
| 2008/0302276 A1 | 12/2008 | Perez-Pena et al. | |

FOREIGN PATENT DOCUMENTS

| | | |
|---|---|---|
| CN | 102471157 A | 5/2012 |
| CN | 102909783 A | 2/2013 |
| CN | 105440140 A | 3/2016 |
| JP | S60103069 A | 6/1985 |

\* cited by examiner

*Primary Examiner* — Anthony J Green

(57) ABSTRACT

Disclosed is a $CO_2$ solidified fiber cement board and its preparation method. The matrix composition of the fiber cement board prepared in this disclosure is calcium carbonate, which has high compactness, and the crystal form of calcium carbonate is adjusted by adding shell powder to improve the toughness of the matrix, so that the fiber cement board has excellent mechanics and durability performance. In addition, the preparation process does not require high temperature maintenance, and has the characteristics of normal temperature preparation, which creates conditions for the introduction of organic synthetic fibers, so that the organic synthetic fibers can further improve the brittleness of cement fiberboard. While reducing energy consumption, the preparation process can also effectively solve the problem that excessive pressure is easily generated in the fiberboard under high temperature conditions in the existing high-temperature and high-pressure curing process.

10 Claims, 1 Drawing Sheet

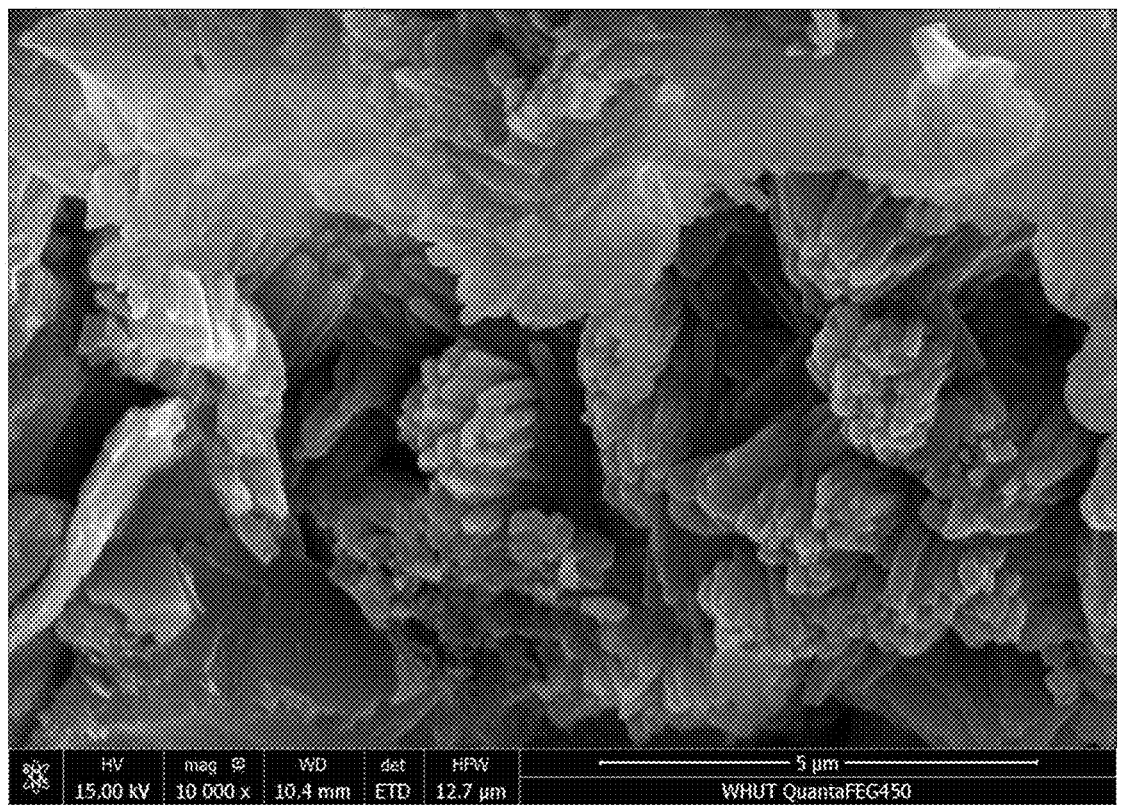

CO₂ SOLIDIFIED FIBER CEMENT BOARD AND ITS PREPARATION METHOD

FIELD OF THE DISCLOSURE

The disclosure relates to the technical field of building material, in particular to $CO_2$ solidified fiber cement board and its preparation method.

BACKGROUND

The existing fiber cement board is a composite material that uses silicate cement as a binder, plant fibers and other fibers as toughness reinforcing materials, and forms a matrix structure through hydration reaction. It has the dual advantages of cement and wood, and is widely used in interior and exterior wall panels, mobile houses, and other fields.

However, there are some problems with existing fiber cement boards. For example, the hydration matrix of cement is composed of C—S—H gel, which is bonded by silicon-oxygen bonds with high brittleness, resulting in high brittleness of the material, and organic synthetic fibers are usually introduced to enhance the toughness of the material. However, the high temperature and high pressure preparation process currently used for fiber cement boards can easily degrade the organic matter in the organic synthetic fibers, thereby reducing the toughness of the organic synthetic fibers. Therefore, the usual reinforcing fibers are mainly high temperature resistant cellulose fibers, but their extremely high specific surface area leads to a high water absorption rate of the material. When exposed to alternating dry-wet or freeze-thaw environment, it is easy to absorb water and swell, resulting in attenuation of mechanical properties and decreased durability, which is also an important reason why fiber cement boards are less used in the field of exterior wall panels.

SUMMARY

The purpose of this disclosure is to overcome the above technical deficiencies and provide a $CO_2$ solidified fiber cement board and its preparation method, the fiber cement board prepared by the preparation method has excellent mechanical strength and durability.

This disclosure provides a preparation method for $CO_2$ solidified fiber cement board, comprising the following steps;

dispersing cellulose fibers and organic synthetic fibers in water to obtain a fiber suspension;

mixing a gelling component and an additive to obtain a mixed material; the gelling component comprises one or more of calcium silicate mineral powder, calcium silicate mineral phase-rich steel slag powder, and calcium silicate mineral phase-rich magnesium slag powder; the additive comprises silica fume, limestone powder, shell powder and pigment;

mixing the fiber suspension, the mixed material, and water to obtain a slurry, and the slurry is sequentially dewatered, grouted, and statically maintained to obtain a slab, and the slab is cured in a $CO_2$ atmosphere to obtain the fiber cement board.

This disclosure also provides a fiber cement board prepared by the above preparation method.

The gelling component used in this disclosure has excellent $CO_2$ reactivity and can undergo mineralization reaction with $CO_2$ to form a matrix structure composed of calcium carbonate, which is the main source of strength for fiber cement boards. The silica fume improves the coating performance of the slurry and the density of the slab through its regular spherical particle morphology and ultra-fine particle size. The limestone powder has a similar particle size distribution to the gelling component, and it partially replaces the gelling component to reduce the material cost.

The composition of the shell powder is aragonite-type calcium carbonate crystal grain, during the reaction between the slab and $CO_2$, more acicular aragonite phases can be induced to form, and the overall toughness of the fiber cement board can be improved by increasing the toughness of the calcium carbonate matrix; at the same time, this disclosure utilizes the advantages of cellulose fibers and organic synthetic fibers. On the one hand, the high specific surface area of cellulose fibers is used to adsorb powder particles to improve the slurries of the slurry. On the other hand, the introduction of organic synthetic fibers further improves the toughness of the fiber cement board, thereby improving the durability and mechanical properties of the fiber cement board.

The fiber cement board provided by this disclosure abandons the traditional high-temperature autoclave curing process, and the fiber cement board can be prepared at normal temperature by mineralization with $CO_2$ under the atmosphere of $CO_2$. It is highly compatible with the existing preparation process with low price, it is environmentally friendly and is easy to popularize on a large scale.

The matrix composition of the fiber cement board prepared in this disclosure is calcium carbonate, which has high compactness, and the crystal form (aragonite phase) of calcium carbonate is adjusted by adding shell powder to improve the toughness of the matrix, so that the fiber cement board has excellent mechanics and durability performance. In addition, the preparation process does not require high temperature maintenance, and has the characteristics of normal temperature preparation, which creates conditions for the introduction of organic synthetic fibers, so that the organic synthetic fibers can further improve the brittleness of cement fiberboard. While reducing energy consumption, the preparation process can also effectively solve the problem that excessive pressure is easily generated in the fiberboard under high temperature conditions in the existing high-temperature and high-pressure curing process, which causes air expansion and moisture vaporization in the board, and further causes the fiberboard delamination.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures:

FIG. 1 is an SEM image of the fiber cement board prepared by Embodiment 1.

DETAILED DESCRIPTION OF PREFERRED EMBODIMENTS

This disclosure provides a preparation method for $CO_2$ solidified fiber cement board, comprising the following steps;

dispersing cellulose fibers and organic synthetic fibers in water to obtain a fiber suspension;

mixing a gelling component and an additive to obtain a mixed material; the gelling component comprises one or more of calcium silicate mineral powder, calcium silicate mineral phase-rich steel slag powder, and calcium silicate mineral phase-rich magnesium slag powder; the additive comprises silica fume, limestone powder, shell powder and pigment;

mixing the fiber suspension, the mixed material, and water to obtain a slurry, and the slurry is sequentially dewatered, grouted, and statically maintained to obtain a slab, and the slab is cured in a $CO_2$ atmosphere to obtain the fiber cement board.

In this disclosure, unless otherwise specified, the required preparation raw materials are all commercially available commodities well known to those skilled in the art.

In this disclosure, dispersing cellulose fibers and organic synthetic fibers in water to obtain a fiber suspension. In this disclosure, the length of the cellulose fibers is preferably 1-5 mm, and the organic synthetic fibers comprise PVA fibers and/or glass fibers; when the organic synthetic fibers are PVA fibers and glass fibers, this disclosure does not specifically limit the ratio of the two fibers, and any ratio can be used.

In this disclosure, there is no specific requirements on the amount of water, as long as the cellulose fibers and the organic synthetic fibers can sufficiently form a suspension. In this disclosure, there is no specific requirements on the dispersing process, as long as the material can be uniformly dispersed according to a process well known in the art; in the embodiments of this disclosure, it is specifically stirring in a stirring device to uniformly disperse the fibers in water. In this disclosure, there is no specific requirements on the stirring speed, and the materials can be uniformly mixed according to a process well known in the art.

In this disclosure, a gelling component and an additive are mixed to obtain a mixed material. In this disclosure, the gelling component includes one or more of calcium silicate mineral powder, calcium silicate mineral phase-rich steel slag powder, and calcium silicate mineral phase-rich magnesium slag powder; The calcium silicate mineral powder preferably includes one or more of γ-type dicalcium silicate (γ-C2S), tricalcium disilicate and monocalcium silicate. In this disclosure, when the gelling components are several of the above. In this disclosure, there is no specific restrictions on the ratio of different types of gelling components, and any ratio is acceptable. When the calcium silicate mineral powder is several of the above, this disclosure does not specifically limit the ratio of different types of calcium silicate mineral powder, and any ratio is acceptable.

In this disclosure, the mineral phase composition of the calcium silicate mineral phase-rich steel slag powder comprises γ-type dicalcium silicate, RO phase, calcium ferrite, tricalcium silicate, free calcium oxide, and free magnesium oxide, wherein the total mass content of dicalcium silicate and tricalcium silicate is preferably more than 40%. In this disclosure, there is no specific limitation on the source of the calcium silicate mineral phase-rich steel slag powder, and any sources well known in the art including the calcium silicate mineral phase-rich steel slag powder with the above-mentioned composition can be used. In this disclosure, the mineral phase composition of the calcium silicate mineral phase-rich magnesium slag powder includes γ-type dicalcium silicate, β-type dicalcium silicate, and magnesium oxide, wherein the total mass content of dicalcium silicate is preferably more than 50%. In this disclosure, there is no specific limitation on the source of the calcium silicate mineral phase-rich magnesium slag powder, and any sources well known in the art include the calcium silicate mineral phase-rich magnesium slag powder with the above composition can be used.

In this disclosure, the average particle size of the gelling component is preferably less than 50 μm.

In this disclosure, the additive also comprises expanded perlite; the particle size of the expanded perlite is 50-300 μm. The apparent density of fiber cement boards can be adjusted using the expanded perlite.

In this disclosure, the particle size of the silica fume is 0.2-5 μm, and the $SiO2$ mass content in the silica fume is more than 90%; the particle size of the limestone powder is 10-20 μm, and the particle size of the shell powder is 10-100 μm.

In this disclosure, the pigment comprises cadmium red, titanium nickel yellow, titanium chromium brown, cobalt blue or cobalt green, and the particle size of the pigment is 10-20 μm.

In this disclosure, the gelling component and the additive are stirred in a stirring device or a mixing device for 10 to 25 min, and the material is fully dispersed by the impact of mechanical force and coarse particles. In this disclosure, there is no specifical limitation on the stirring speed, and the materials can be uniformly mixed according to any process well known in the art.

In this disclosure, the mass ratio of the gelling component, the expanded perlite, the silica fume, the limestone powder, the shell powder, the cellulose fibers, the organic synthetic fibers and the pigments is preferably (55~75):(0~10):(4~8):(10~20):(5~10):(2~4):(2~4):(0.1~0.2), more preferably (60~70):(1~5):(4~6):(15~19):(6~7.8):(2.5~3):(2.5~3):(0.1~0.2).

After the fiber suspension and the mixed material are obtained, mixing the fiber suspension, the mixed material, and water to obtain a slurry, and the slurry is sequentially dewatered, grouted, and statically maintained to obtain a slab, and the slab is cured in a $CO_2$ atmosphere to obtain the fiber cement board. In this disclosure, the mixing process of the fiber suspension, the mixed material, and the water is preferably that the fiber suspension, the mixed material, and the water are placed in a beating machine, and stirred for 10-15 minutes to form a slurry. In this disclosure, the water is preferably added in an amount such that the mass concentration of the mixed slurry reaches 10%-20%. In this disclosure, there is no specific limitation on the stirring speed, and the materials can be uniformly mixed according to any process well known in the art.

After obtaining the slurry, in this disclosure, the obtained slurry is preferably placed in a vacuum filtration device, and subjected to suction filtration and dehydration to form a slab. In this disclosure, there is no specific limitation on the water content of the slab after the suction filtration and dehydration, and suction filtration can be performed until there is no obvious water flow out of the slab. In this disclosure, there is no specific limitation on the vacuum suction filtration device and the suction filtration process, and a device well-known in the art can be selected and performed according to a well-known process.

In this disclosure, after the slab is formed, the slab is preferably transferred to a grouting mold for grouting. Excess moisture in the slab is removed by grouting. In this disclosure, there is no specific limitation on the water content of the slab after grouting, and the grouting can be performed with a specified pressure. In this disclosure, there is no specific limitation on the grouting mold, and any corresponding mold well known in the art can be used. In this disclosure, the pressure of the grouting is preferably 300-850 kN, and the dwell time is preferably 45-60 s.

In this disclosure, after the grouting is completed, the obtained slab is preferably taken out and statically maintained. The static maintenance is preferably carried out in a curing box, the temperature of the static maintenance is preferably 40~50° C., the relative humidity is preferably less than 50%, and the curing time is preferably 1~4 h, and more preferably 3 h. In this disclosure, there is no specific limitation on the curing box, and any curing box well known in the art that can meet the above conditions can be used. In this disclosure, the mass ratio of water to solid in the slab obtained after the static maintenance is preferably (0.05~0.2):1, and more preferably 0.1:1.

In this disclosure, after the static maintenance is completed, the obtained slab is cured in a $CO_2$ atmosphere to obtain the fiber cement board. In this disclosure, the conditions for curing under $CO_2$ atmosphere are preferably: curing temperature 5~90° C., relative humidity 30~80%, air pressure 0.05~0.3 MPa, more preferably 0.2 MPa; curing time 2~48 h, more preferably 12 h.

In this disclosure, the source of $CO_2$ gas used in the $CO_2$ atmosphere is preferably $CO_2$-riched industrial kiln tail gas, or preferably high-concentration $CO_2$ gas enriched from various industrial waste gases. In this disclosure, there is no specific limitation on the source of the $CO_2$-rich industrial kiln tail gas and the $CO_2$ content therein, and the industrial kiln tail gas can be obtained in any manner well known in the art.

In this disclosure, there is no specific limitation on the type and source of the industrial waste gas, and it can be obtained in any manner well known in the art. In this disclosure, the volume concentration of the high-concentration $CO_2$ gas is preferably 20%-99%. In this disclosure, there is no specific limitation on the enrichment process, and the $CO_2$ gas in the above concentration range can be obtained according to any process well known in the art. This disclosure makes full use of $CO_2$-rich industrial kiln tail gas, or high-concentration $CO_2$ gas enriched from various industrial waste gases, which has good environmental protection benefits.

In this disclosure, the fiber cement board prepared by the preparation method described in the above-mentioned technical scheme is provided.

The technical solutions in this disclosure will be clearly and completely described below with reference to the embodiments in this disclosure. Obviously, the described embodiments are only some, but not all, embodiments of this disclosure. Based on the embodiments in this disclosure, all other embodiments obtained by those of ordinary skill in the art without creative efforts shall fall within the protection scope of this disclosure.

In the following embodiments, the average particle size of the gelling component used is less than 50 μm; The particle size of the expanded perlite is 50~300 μm, and the particle size of the silica fume is 0.2~5 μm, and the $SiO_2$ mass content in the silica fume is more than 90%, the particle size of limestone powder is 10-20 μm, the particle size of the shell powder is 10-100 μm; the particle size of the pigment is 10-20 μm; the length of the cellulose fibers is 3 mm.

In terms of mass percentage, the chemical composition of the steel slag powder is: 41.77% of CaO, 10.73% of MgO, 9.8% of $SiO_2$, 2.55% of $Al_2O_3$, and 29.24% of $Fe_2O_3$; the chemical composition of magnesium slag powder is: 28.87% of $SiO_2$, 8.17% of $Fe_2O_3$, 53.86% of CaO, and 7.24% of MgO.

Embodiment 1 (Low Dosage of γ-$C_2$S)

The solid components are: 60 parts of γ-$C_2$S, 5 parts of expanded perlite, 6 parts of silica fume, 15 parts of limestone powder, 7.8 parts of shell powder, 0.2 parts of cadmium red pigment, 3 parts of cellulose fibers, and 3 parts of PVA fibers;

Preparation Method:

According to the above ratio, the cellulose fibers, the PVA fibers and 300 parts of water are added to the stirring device and stirred to form a suspension;

According to the above ratio, the gelling component (γ-$C_2$S) and the additive (expanded perlite, silica fume, limestone powder, shell powder, and pigment) are stirred in a stirring device for 15 min to obtain mixed material;

According to the above ratio, the suspension and the mixed material are placed in a beating machine, added with water with 15% concentration of slurry, and stirred for 10 min to form a slurry.

Pouring the obtained slurry into a vacuum filtration device for filtration and dehydration to form a slab, and the slab is moved to the grouting mold for grouting, with a pressure of 600 kN and a holding time of 60 s;

The slab after grouting is taken out and placed in a curing box for static maintenance. The static maintenance condition is 40° C., the relative humidity is below 50%, the maintenance time is 3 h, the slab is statically maintained until the mass ratio of water and solid is 0.1:1;

After the static maintenance, the obtained slab is placed in a reaction kettle for curing under $CO_2$ atmosphere, the curing temperature is 40° C., the relative humidity is 50%, the air pressure is 0.2 MPa, and the curing time is 12 h; The source of $CO_2$ gas is high-concentration $CO_2$ gas enriched from industrial waste gas, and the volume concentration of $CO_2$ is 99%;

After the curing, fiber cement board is obtained.

Embodiment 2 (High Dosage of γ-$C_2$S)

The solid component is: 70 parts of γ-$C_2$S, 2 parts of expanded perlite, 4 parts of silica fume, 10 parts of limestone powder, 7.8 parts of shell powder, 0.2 part of cadmium red pigment, 3 parts of cellulose fibers, and 3 parts of PVA fibers;

The preparation method is the same as that in Embodiment 1.

Embodiment 3 (γ-$C_2$S and Steel Slag Powder)

The solid component is: 60 parts of γ-$C_2$S and steel slag powder, 5 parts of expanded perlite, 6 parts of silica fume, 15 parts of limestone powder, 7.8 parts of shell powder, 3 parts of cellulose fibers, 3 parts of PVA fibers, and 0.2 parts of cadmium red pigment;

The preparation method is the same as that in Embodiment 1.

Embodiment 4

The solid component is: 60 parts of steel slag powder, 5 parts of expanded perlite, 6 parts of silica fume, 15 parts of limestone powder, 7.8 parts of shell powder, 3 parts of cellulose fibers, 3 parts of PVA fibers, and 0.2 parts of titanium nickel yellow pigment.

The preparation method is the same as that in Embodiment 1.

Embodiment 5

The solid component is: 60 parts of magnesium slag powder, 5 parts of expanded perlite, 6 parts of silica fume, 15 parts of limestone powder, 7.8 parts of shell powder, 3 parts of cellulose fibers, 3 parts of PVA fibers, and 0.2 parts of cadmium red pigment.

The preparation method is the same as that in Embodiment 1.

Embodiment 6 (High Dosage of Expanded Perlite)

The solid component is: 60 parts of $\gamma\text{-}C_2S$, 10 parts of expanded perlite, 6 parts of silica fume, 10 parts of limestone powder, 7.8 parts of shell powder, 3 parts of cellulose fibers, 3 parts of PVA fibers, and 0.2 parts of cadmium red pigment.

The preparation method is the same as that in Embodiment 1.

Embodiment 7 (Low Dosage of Expanded Perlite)

The solid component is: 60 parts of $\gamma\text{-}C_2S$, 1 part of expanded perlite, 6 parts of silica fume, 19 parts of limestone powder, 7.8 parts of shell powder, 3 parts of cellulose fibers, 3 parts of PVA fibers, and 0.2 parts of titanium nickel yellow pigment.

The preparation method is the same as that in Embodiment 1.

Embodiment 8 (20% $CO_2$)

The solid component is: 60 parts of $\gamma\text{-}C_2S$, 5 parts of expanded perlite, 6 parts of silica fume, 15 parts of limestone powder, 7.8 parts of shell powder, 3 parts of cellulose fibers, 3 parts of PVA fibers, and 0.2 parts of cadmium red pigment.

The difference between the preparation method and Embodiment 1 is only that the source of $CO_2$ gas is industrial kiln tail gas containing $CO_2$, the $CO_2$ volume concentration is 20%, the gas pressure is 0.2 MPa, and the $CO_2$ curing time is 18 h.

Comparative Embodiment 1 (No Shell Powder)

The solid component is: 63 parts of $\gamma\text{-}C_2S$, 5 parts of expanded perlite, 6 parts of silica fume, 19.8 parts of limestone powder, 0 parts of shell powder, 3 parts of cellulose fibers, 3 parts of PVA fibers, and 0.2 parts of cadmium red pigment.

The preparation method is the same as that in Embodiment 1.

Comparative Embodiment 1 (No Silica Fume)

The solid component is: 61 parts of $\gamma\text{-}C_2S$, 5 parts of expanded perlite, 0 parts of silica fume, 20 parts of limestone powder, 7.8 parts of shell powder, 3 parts of cellulose fibers, 3 parts of PVA fibers, and 0.2 parts of cadmium red pigment.

The preparation method is the same as that in Embodiment 1.

Comparative Embodiment 3 (Only Cellulose Fibers Added)

The solid component is: 60 parts of $\gamma\text{-}C_2S$, 5 parts of expanded perlite, 6 parts of silica fume, 15 parts of limestone powder, 7.8 parts of shell powder, 6 parts of cellulose fibers, 0 parts of PVA fibers, and 0.2 parts of cadmium red pigment.

The preparation method is the same as that in Embodiment 1.

Comparative Embodiment 4 (Only Organic Synthetic Fibers Added)

The solid component is: 60 parts of $\gamma\text{-}C_2S$, 5 parts of expanded perlite, 6 parts of silica fume, 15 parts of limestone powder, 7.8 parts of shell powder, 0 parts of cellulose fibers, 6 parts of PVA fibers, and 0.2 parts of cadmium red pigment.

The preparation method is the same as that in Embodiment 1.

Characterization and Performance Test

1) FIG. 1 is an SEM image of the fiber cement board prepared in Embodiment 1, as can be seen from FIG. 1, after carbonization curing, the fiber cement board has formed a dense microstructure, wherein aragonite is closely packed, which helps to improve the density of the fiber cement board and reduce defects, indicating that the fiber cement board has high flexural strength.

2) The physical properties of the fiber cement boards prepared in the above-mentioned Embodiments 1 to 8 and comparative Embodiments 1 to 4 are detected, the flexural strength is the flexural strength of the sample after water retention, the flexural strength and water absorption were tested according to GB/T7019-2014, and the test results are shown in Table 1.

TABLE 1

Physical properties of fiber cement boards prepared by Embodiments 1 to 8 and Comparative Embodiments 1 to 4.

| | Density ($g/cm^3$) | Flexural strength (MPa, standard value ≥24) | Water absorption (%, standard value ≤28) | whether stratified or not |
|---|---|---|---|---|
| Embodiment 1 | 1.81 | 26.5 | 17.4 | No |
| Embodiment 2 | 1.88 | 27.4 | 16.6 | No |
| Embodiment 3 | 1.84 | 26.1 | 17.3 | No |
| Embodiment 4 | 1.77 | 25.4 | 18.6 | No |
| Embodiment 5 | 1.89 | 27.9 | 16.3 | No |
| Embodiment 6 | 1.66 | 25.6 | 18.1 | No |
| Embodiment 7 | 1.84 | 27.1 | 16.9 | No |
| Embodiment 8 | 1.82 | 26.3 | 17.1 | No |
| Comparative Embodiment 1 | 1.71 | 20.4 | 22.4 | No |
| Comparative Embodiment 2 | 1.73 | 21.6 | 21.5 | No |
| Comparative Embodiment 3 | 1.84 | 21.3 | 21.7 | No |
| Comparative Embodiment 4 | 1.61 | 10.1 | 24.3 | Yes |

As can be seen from Table 1, the fiber cement board prepared by this disclosure is excellent in flexural strength, illustrating that the toughness is excellent, and the water absorption is lower, indicating that the fiber cement board has excellent mechanical properties and durability (related to water absorption). According to the national building materials industry standard (JC/T 412.1-2018), the fiber cement board prepared by this disclosure can be used indoors and outdoors, and can directly withstand sunlight, rain, snow, or frost.

From the data contrast of the fiber cement board prepared by Embodiment 1~8 in table 1 and the fiber cement board prepared by Comparative Embodiment 1, the shell powder dosage in fiber cement board plays an important role in the flexural strength of the fiber cement board. Without the addition of shell powder, the accumulation and filling of aragonite in the fiber cement board will be lacking, which will eventually lead to a significant decrease in the flexural strength of the fiber cement board.

By the data contrast of the fiber cement board prepared by Embodiment 1-8 in Table 1 and the fiber cement board prepared by Comparative Embodiment 2, the silica fume content in fiber cement board plays an important role in the density, flexural strength, and water absorption of the fiber cement board. Without the addition of silica fume, the fiber cement board lacks micro aggregate filling defects, and the slurry coating performance of the slurry and the density of the slab are significantly decreased, resulting in a significant decrease in the flexural strength and a significant increase in the water absorption of the fiber cement board.

By the data contrast of the fiber cement board prepared by Embodiment 1~8 in Table 1 and the fiber cement board prepared by Comparative Embodiment 3~4, cellulose fibers and organic synthetic fibers in fiber cement board have synergistic complementary effect, adding only one of cellulose fibers or organic synthetic fibers will lead to a significant decrease in the flexural strength of the fiber cement board.

It is to be understood, however, that even though numerous characteristics and advantages of this disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A preparation method for $CO_2$ solidified fiber cement board, comprising the following steps;
    dispersing cellulose fibers and organic synthetic fibers in water to obtain a fiber suspension;
    mixing a gelling component and an additive to obtain a mixed material; the gelling component comprises one or more of calcium silicate mineral powder, calcium silicate mineral phase-rich steel slag powder, and calcium silicate mineral phase-rich magnesium slag powder; the additive comprises silica fume, limestone powder, shell powder and pigment;
    mixing the fiber suspension, the mixed material, and water to obtain a slurry, and the slurry is sequentially dewatered, grouted, and statically maintained to obtain a slab, and the slab is cured in a $CO_2$ atmosphere to obtain the fiber cement board.

2. The preparation method for $CO_2$ solidified fiber cement board according to claim 1, wherein the calcium silicate mineral powder includes one or more of γ-type dicalcium silicate, tricalcium disilicate, and monocalcium silicate; the average particle size of the gelling component is less than 50 μm.

3. The preparation method for $CO_2$ solidified fiber cement board according to claim 1, wherein the additive also comprises expanded perlite; the particle size of the expanded perlite is 50-300 the particle size of the silica fume is 0.2-5 and the $SiO_2$ mass content in the silica fume is more than 90%;
    the particle size of the limestone powder is 10-20 and the particle size of the shell powder is 10-100 μm.

4. The preparation method for $CO_2$ solidified fiber cement board according to claim 1, wherein the pigment comprises cadmium red, titanium nickel yellow, titanium chromium brown, cobalt blue or cobalt green, and the particle size of the pigment is 10-20 μm.

5. The preparation method for $CO_2$ solidified fiber cement board according to claim 1, wherein the length of the cellulose fiber is 1-5 mm, and the organic synthetic fiber comprises PVA fiber.

6. The preparation method for $CO_2$ solidified fiber cement board according to claim 1, wherein the additive also comprises expanded perlite, and wherein the mass ratio of the gelling component, expanded perlite, the silica fume, the limestone powder, the shell powder, the cellulose fibers, the organic synthetic fibers, and the pigments is (55~75):(0~10):(4~8):(10~20):(5~10):(2~4):(2~4):(0.1~0.2).

7. The preparation method for $CO_2$ solidified fiber cement board according to claim 1, wherein a pressure of the grouting is 300-850 kN with a pressure holding time of 45~60 s.

8. The preparation method for $CO_2$ solidified fiber cement board according to claim 1, wherein a temperature of the static maintenance is 40-50° C. with a relative humidity of less than 50% and a maintenance time of 1-4 h.

9. The preparation method for $CO_2$ solidified fiber cement board according to claim 1, wherein curing conditions in the $CO_2$ atmosphere are: curing temperature of 5 to 90° C., relative humidity of 30% to 80%, air pressure of 0.05 to 0.3 MPa, and time of 2 to 48 hours.

10. A $CO_2$ solidified fiber cement board prepared by the preparation method for $CO_2$ solidified fiber cement board according to claim 1.

* * * * *